United States Patent [19]

Reel

[11] Patent Number: 5,372,373
[45] Date of Patent: Dec. 13, 1994

[54] AXLE PIVOT ASSEMBLY

[76] Inventor: Milton M. Reel, 15103 Willson Ct., Apple Valley, Calif. 92307

[21] Appl. No.: 75,640

[22] Filed: Jun. 11, 1993

[51] Int. Cl.$^5$ .............................................. F16C 23/00
[52] U.S. Cl. .................................... 280/96.1; 384/208
[58] Field of Search .................. 280/96.1, 660, 663, 280/673, 674, 688; 384/206, 208

[56] References Cited

U.S. PATENT DOCUMENTS

| | | | |
|---|---|---|---|
| Re. 15,715 | 11/1923 | Gleason | 308/120 |
| 1,452,531 | 4/1923 | Sherbondy | 384/396 |
| 1,489,383 | 4/1924 | Church | 384/396 |
| 1,568,782 | 1/1926 | Swayne | 384/396 |
| 1,999,394 | 4/1935 | Burnett | 384/396 |
| 2,524,505 | 10/1950 | Yonamine | 267/20 |
| 2,689,756 | 9/1954 | Carlson | 287/93 |
| 2,788,221 | 4/1957 | Pritchard | 280/95 |
| 2,838,331 | 6/1958 | Coleman | 287/100 |
| 3,659,869 | 5/1972 | Hase et al. | 280/96.1 |
| 4,243,192 | 1/1981 | Johnson | 384/208 |
| 4,336,953 | 6/1982 | Low | 280/95 R |
| 4,457,536 | 7/1984 | Rumpel | 280/663 |
| 4,458,913 | 7/1984 | Rumpel | 280/663 |
| 4,480,852 | 11/1984 | Rumpel | 280/663 |
| 4,869,527 | 9/1989 | Coddens | 280/663 |

FOREIGN PATENT DOCUMENTS 532074 8/1955 Italy.

Primary Examiner—Kenneth R. Rice
Assistant Examiner—Paul N. Dickson
Attorney, Agent, or Firm—John R. Flanagan

[57] ABSTRACT

An axle pivot assembly, used to mount an axle to a pair of brackets on a vehicle frame, includes an annular housing, an annular retaining nut, and a spherical bearing. The housing extends through an opening in the axle and has an annular rim on one end abutting against one side of the axle. The nut is fastened on an opposite end of the housing and clamps the axle between the housing rim and the nut. The spherical bearing has an outer annular ring and an inner annular spherical ring universally rotatably mounted within the outer ring. The outer ring seats against a shoulder defined within a bore in the housing and is retained therein by a snap ring. The axle pivot assembly also includes an elongated bolt and a pair of annular spacers. The bolt is fastened to and extends between the vehicle frame brackets and through an opening in the inner ring. The spacers are mounted over the bolt, disposed between and engaged with the vehicle frame brackets and have annular recessed portions on adjacent inner ends extending through the opening in the inner ring. The spacers confine the inner ring at a fixed location between facing shoulders defined by the annular recessed portions of the spacers and thereby limit the housing and the axle itself to pivotal movement about a fixed point relative to the vehicle frame brackets.

16 Claims, 1 Drawing Sheet

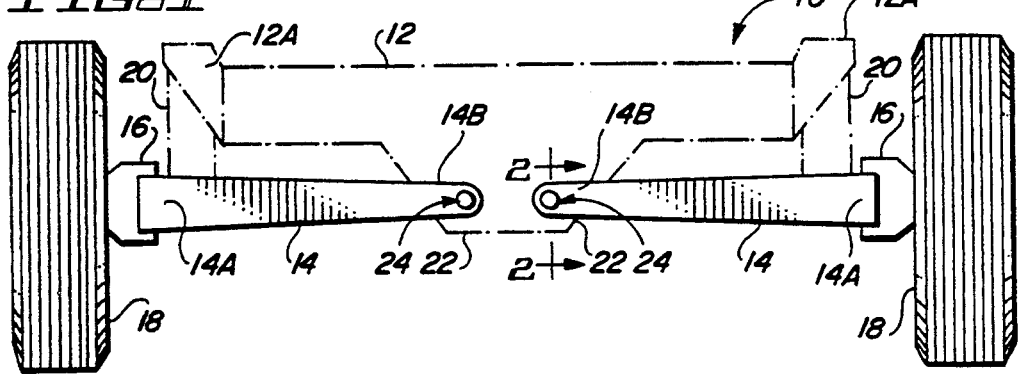
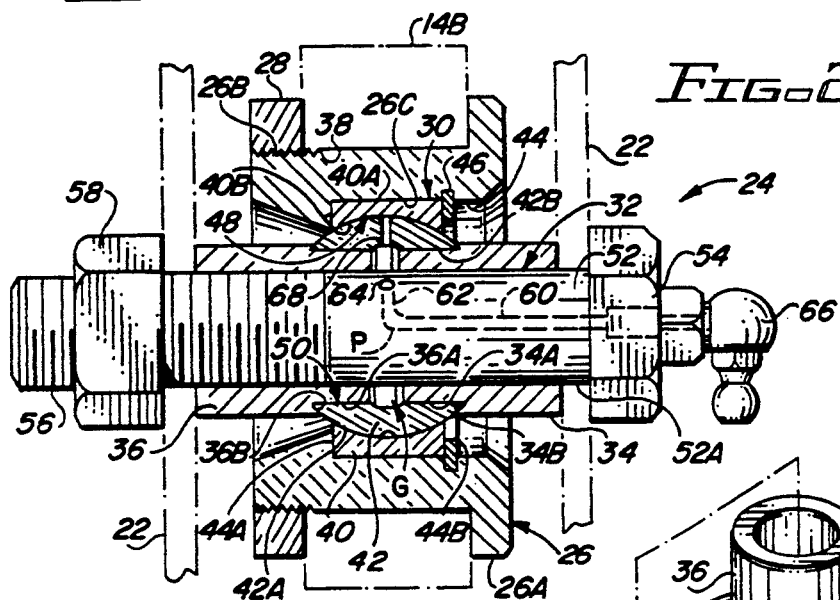
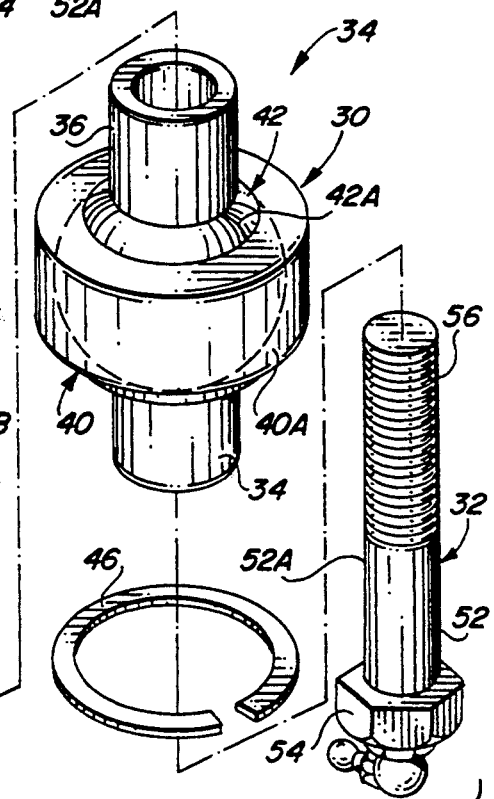

AXLE PIVOT ASSEMBLY

BACKGROUND OF THE INVENTION

1. Field of the Invention

The present invention generally relates to vehicle axle mounting arrangements and, more particularly, is concerned with an axle pivot assembly for fastening the pivot point of the axle at a fixed location relative to the vehicle frame.

2. Description of the Prior Art

Some rear wheel driven vehicles having independent front axles mounted at inboard ends to the middle of the vehicle chassis or frame and at outboard ends to steering knucles which, in turn, are connected to the front wheels and to linkage for steering the front wheels. The inboard ends of the axles are articulately mounted to the vehicle frame by respective pivot assemblies so that the axles are capable of undergoing pivotal motion in all directions. Thus, for precision driving of the vehicle and for minimizing tire wear the kind of pivot connection between the axles and vehicle frame is very important. Ideally, the pivot connection should be one which holds the pivot point of the axle on the frame at a fixed location.

However, in the case of some vehicles, the pivot assemblies supplied as original equipment by the vehicle manufacturer employ flexible molded rubber bushings. A problem with using a flexible molded rubber bushing is that it does not hold the actual pivot point of the axle at a fixed location. During normal driving, lateral forces applied to the axles will move them either inboard or outboard depending on the direction of the force. Consequently, each axle's companion wheel is turned in a direction opposite to the direction of the movement of the axle, requiring oversteering by the operator to compensate for the axle float.

For example, when the wheels are turned to the left a force is applied to the axles moving them to the left. This movement causes the wheels to turn back to the right because they are also attached to the steering linkage, which does not float. Thus, additional control input is needed from the operator which results in oversteering to the left. Oversteering to the left then creates the need for the operator to apply a control input to the right to counteract the oversteering, starting the whole steering process over again. As a result, the operator seems to steer the vehicle in a weaving pattern down the road giving the appearance of being inebriated.

Consequently, a need exists for an axle pivot assembly which will overcome the aforementioned problems without introducing new ones in their place.

SUMMARY OF THE INVENTION

The present invention provides an axle pivot assembly designed to satisfy the aforementioned need. The axle pivot assembly of the present invention holds the pivot point of the axle at a fixed location on the vehicle chassis thereby eliminating axle float and thus the need for oversteering to compensate for it. The construction of the axle pivot assembly ensures that the pivot point of the respective axle relative to the frame is always fixed and is independent of the directions and magnitudes of the forces acting on the vehicle wheels or on the axle during driving, especially during turns.

The stability of the pivot point results from the unique design and construction of the axle pivot assembly of the present invention. The axle pivot assembly employs a spherical bearing which allows the axle to swing universally or in all directions. A round cavity is formed in the axle at the inner end portion thereof. An annular pivotal housing is placed into the round cavity and fastened to the inner end portion of the axle. In such manner, a rigid pivotal connection is established between the axle and pivot housing which eliminates random uncommanded steering excursions, improves steering response to control input, and reduces uneven tire wear. Further, the installation and disassembly of the axle pivot assembly of the present invention is very simple and easy to accomplish without the need for special tools.

Accordingly, the present invention is directed to an axle pivot assembly for mounting an axle to a pair of brackets of a vehicle frame to undergo pivotal movement about a fixed point relative to the vehicle frame. The axle pivot assembly comprises:

(a) means for rigidly fastening to an axle of a vehicle;

(b) means for coupling to the fastening means so as to undergo universal pivoting about a fixed location relative thereto and to the axle;

(c) an elongated member extendable between and fastenable at opposite ends to a pair of brackets of a vehicle frame and extendable through coupling means; and (d) means mounted on the elongated member and disposed between and engaged with the brackets of the vehicle frame for confining the coupling means at a fixed location along the elongated member and thereby limiting the axle itself to pivotal movement about a fixed point relative to the vehicle frame brackets.

More particularly, the fastening means is an annular housing extendable through an opening in the axle. The annular housing has an annular rim on one axial end thereof for abutting against one side of the axle. The fastening means also includes an annular retaining element fastenable to an opposite axial end of the housing in order to clamp the axle between the retaining element and the annular rim on the housing.

Further, the coupling means is a spherical bearing having an outer annular ring and an inner annular spherical ring universally rotatably mounted within the outer annular ring. The outer ring is stationarily attached to and seated within a bore through the housing. A snap ring is releasably mountable in a groove defined in the bore of the housing adjacent to the one axial end thereof for retaining the outer annular ring seated against a shoulder defined within the bore in the housing.

Also, the elongated member is an elongated bolt extendable between and fastenable at opposite ends to the brackets of the vehicle frame and extendable through an opening in the inner ring of the spherical bearing. The confining means includes a pair of annular spacers mounted over the elongated bolt, disposed between and engaged with the brackets of the vehicle frame and stationarily coupled with the inner ring so as to confine the inner ring in a fixed location along the elongated bolt and thereby limit the annular housing and the axle itself to pivotal movement about a fixed point relative to the vehicle frame brackets. The annular spacers have annular recessed portions defined on adjacent inner ends thereof extending through the opening in the inner ring and confining the inner ring in the fixed location being located between facing shoulders defined by the annular recessed portions of the spacers.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a diagrammatical front elevational view of a vehicle axle mounting arrangement employing a pair of pivot axle assemblies in accordance with the present invention.

FIG. 2 is an enlarged cross-sectional view of the pivot axle assembly of the present invention taken along line 2—2 of FIG. 1.

FIG. 3 is an enlarged exploded view of the pivot axle assembly of the present invention.

DETAILED DESCRIPTION OF THE INVENTION

Referring to the drawings and particularly to FIG. 1, there is illustrated in diagrammatic form a vehicle axle mounting arrangement 10 at the front of a vehicle frame 12. The arrangement 10 includes a pair of axles 14 pivotally mounted at their outer ends 14A to steering knuckles 16 which are mounted to the vehicle wheels 18 and a pair of suspension springs 20 supporting the outer ends 12A of the front of the vehicle frame 12 upon the outer ends 14A of the axles 14. The inner ends 14B of the axles 14 are pivotally connected to pairs of brackets 22 on the vehicle frame 12 by a pair of axle pivot assemblies 24 in accordance with the present invention.

Referring to FIG. 2, there is illustrated in detail one of the pair of axle pivot assemblies 24 of the present invention. Each axle pivot assembly 24 mounts the inner end 14B of one of the axles 14 to the pair of brackets 22 on the vehicle frame 12 such that the axle 14 is limited to undergo pivotal movement about a fixed point relative the vehicle frame 12.

Referring to FIGS. 2 and 3, each axle pivot assembly 24 basically includes an annular housing 26, an annular retaining nut 28, a spherical bearing 30, an elongated fastener 32, and a pair of annular spacers 34, 36. The annular housing 26 extends through an opening 38 in the inner end 14B of the axle 14 and has an annular rim 26A on one axial end thereof for abutting against one side of the axle 14, as seen in FIG. 2. The annular retaining nut 28 is internally-threaded so as to be threadably fastenable on an externally-threaded section 26B defined on an opposite axial end of the housing 26. By tightening the nut 28 on the threaded end section 26B of the housing 26, the inner end 14B of the respective axle 14 is clamped between the housing rim 26A and the nut 28.

The spherical bearing 30 of the assembly 24 has an outer annular ring 40 and an inner annular spherical ring 42 which is rotatably mounted within the outer ring 40 for universal pivotal movement relative thereto. The outer ring 40 has an outer cylindrical surface 40A and an inner spherical surface 40B. The outer cylindrical surface 40A of the outer ring 40 is complementary in shape to an inner cylindrical surface 26C defining a bore 44 formed partially through the housing 26 from the one axial end 26A thereof. The outer ring 40 is stationarily seated within the housing bore 44 and against an annular shoulder 44A defined at an inner end of the housing bore 44. The assembly 24 also employs a snap ring 46 adapted to be releasably mounted in an annular groove 44B defined at an outer end of the housing bore 44 for retaining the outer annular ring 40 seated against the bore shoulder 44A. The inner spherical surface 40B of the outer ring 40 is complementary in shape to an outer spherical surface 42A on the inner ring 42 such that the inner ring 42 is captured within an opening 48 defined through the outer ring 40 by the inner spherical surface 40B thereof and so can universally pivot relative to the outer ring 40.

The elongated fastener 32 of the assembly 24 is an elongated bolt 32 is fastenable at opposite ends to and extending between the vehicle frame brackets 22 and through an opening 50 defined through the inner ring 42. More particularly, the elongated bolt 32 has an elongated stem 52 with an enlarged tool engageable head 54 fixed on one end of the stem 52 and an externally-threaded section 56 defined on an opposite end portion of the stem 52. A nut 58 is threaded on the threaded section 56 of the bolt 32 so as to tighten and clamp the fastener 32 to the vehicle frame brackets 22.

The annular spacers 34, 36 of the assembly 24 are in the form of a pair of tubular sleeves. The spacers 34, 36 are mounted over the elongated stem 52 of the bolt 32 and disposed between and engaged at outer ends with the vehicle frame brackets 22. The spacers 34, 36 have respective annular recessed portions 34A, 36A defined on adjacent inner ends of the spacers 34, 36 which extend through the opening 50 in the inner ring 42 being defined by an inner cylindrical surface 42B therein. The inner ring 42 is received about the annular recessed portions 34A, 36A of the spacers 34, 36 such that the spacers 34, 36 thereby confine the inner ring 42 at a fixed location between facing shoulders 34B, 36B defined by the annular recessed portions 34A, 36A of the spacers 34, 36. With such arrangement, the annular housing 26 and the axle 14 itself are thereby limited to pivotal movement relative to the vehicle frame brackets 22 and about a fixed point P located between the vehicle frame brackets 22. The annular housing 26, spherical bearing 30, elongated fastener 32 and annular spacers 34, 36 are all fabricated of a suitable rigid material, such as steel, so that no deformation of the components can occur which would permit floating of the fixed point P.

As best seen in FIG. 2, the elongated stem 52 of the bolt 32 has an internal axial passage 60 and an internal radial passage 62 intersecting the axial passage 60. The radial passage 62 terminates at a hole 64 defined in an external circumferential surface 52A of the bolt stem 52. The internal axial and radial passages 60, 62 together define a path for flow of a suitable lubricant to the hole 64 from a grease fitting 66 mounted on the head 54 at one end of the bolt 32. The hole 64 on the bolt 32 is aligned with a gap G existing between the inner ends of the annular spacers 34, 36 which, in turn, is aligned with an orifice 68 through the inner ring 42 of the spherical bearing 30. With such arrangement, the lubricant can be supplied along the flow path to the interface between the inner and outer rings 42, 40 of the spherical bearing 30.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An axle pivot assembly for mounting an axle to a pair of brackets of a vehicle frame to undergo pivotal movement about a fixed point relative to the vehicle frame, said axle pivot assembly comprising:
   (a) means for rigidly fastening said axle pivot assembly to an axle of a vehicle;
   (b) means for coupling said fastening means to an elongated member so as to undergo univeral pivoting about a fixed location relative thereto and to the axle;
   (c) said elongated member extendable between and fastenable at opposite ends to said pair of brackets of said vehicle frame and extendable through said coupling means; and
   (d) means mounted on said elongated member and disposed between and engaged with the brackets of the vehicle frame for confining said coupling means at a fixed location along said elongated member and thereby limiting the axle itself to pivotal movement about a fixed point relative to the vehicle frame brackets;
   (e) said coupling means including a spherical bearing having an outer annular ring and an inner annular spherical ring universally rotatably mounted within said outer annular ring, said outer ring being stationarily attached to said fastening means and said inner ring being stationarily attached along said elongated member;
   (f) said confining means including a pair of annular spacers mounted over said elongated member, disposed between and engaged with the brackets of the vehicle frame and coupled with said inner ring so as to confine said inner ring in a fixed location along said elongated member and thereby limit said fastening means and the axle itself to pivotal movement about a fixed point relative to the vehicle frame brackets;
   (g) said annular spacers having annular recessed portions defined on adjacent inner ends thereof extending through an opening in said inner ring and confining said inner ring in said fixed location being located between facing shoulders defined by said annular recessed portions of said spacers.

2. The assembly of claim 1 wherein said elongated member is an elongated bolt extendable between and fastenable at opposite ends to the brackets of the vehicle frame and extendable through an opening in said inner ring of said spherical bearing.

3. An axle pivot assembly for mounting an axle to a pair of brackets of a vehicle frame to undergo pivotal movement about a fixed point relative to the vehicle frame, said axle pivot assembly comprising:
   (a) means for rigidly fastening said axle pivot assembly to an axle of a vehicle;
   (b) means for coupling said fastening means to an elongated member so as to undergo universal pivoting about a fixed location relative thereto and to the axle;
   (c) said elongated member extendable between and fastenable at opposite ends to said pair of brackets of said vehicle frame and extendable through said coupling means; and
   (d) means mounted on said elongated member and disposed between and engaged with the brackets of the vehicle frame for confining said coupling means at a fixed location along said elongated member and thereby limiting the axle itself to pivotal movement about a fixed point relative to the vehicle frame brackets;
   (e) said coupling means including a spherical bearing having an outer annular ring and an inner annular spherical ring universally rotatably mounted within said outer annular ring, said outer ring being stationarily attached to said fastening means and said inner ring being stationarily attached along said elongated member;
   (f) said elongated member includes an elongated bolt extendable between and fastenable at opposite ends to the brackets of the vehicle frame and extendable through opening in said inner ring of said spherical bearing;
   (g) said elongated bolt having an internal axial passage and an internal radial passage intersecting said axial passage and terminating at a hole defined in an external circumferential surface of said bolt, said internal axial and radial passages together defining a flow path for lubrication to said hole from a grease fitting mounted on one end of said bolt.

4. The assembly of claim 3 wherein said confining means includes a pair of annular spacers mounted over said elongated member, disposed between and engaged with the brackets of the vehicle frame and coupled with said inner ring so as to confine said inner ring in a fixed location along said elongated member and thereby limit said fastening means and the axle itself to pivotal movement about a fixed point relative to the vehicle frame brackets.

5. An axle pivot assembly for mounting an axle to a pair of brackets of a vehicle frame to undergo pivotal movement about a fixed point relative to the vehicle frame, said axle pivot assembly comprising:
   (a) means for rigidly fastening said axle pivot assembly to an axle of a vehicle;
   (b) means for coupling said fastening means to an elongated member so as to undergo univeral pivoting about a fixed location relative thereto and to the axle;
   (c) said elongated member extendable between and fastenable at opposite ends to said pair of brackets of said vehicle frame and extendable through said coupling means; and
   (d) means mounted on said elongated member and disposed between and engaged with the brackets of the vehicle frame for confining said coupling means at a fixed location along said elongated member and thereby limiting the axle itself to pivotal movement about a fixed point relative to the vehicle frame brackets;
   (e) said coupling means including a spherical bearing having an outer annular ring and an inner annular spherical ring universally rotatably mounted within said outer annular ring, said outer ring being stationarily attached to said fastening means and said inner ring being stationarily attached along said elongated member;
   (f) said elongated member including an elongated bolt extendable between and fastenable at opposite ends to the brackets of the vehicle frame and extendable through an opening in said inner ring of said spherical bearing;
   (g) said confining means including a pair of annular spacers mounted over said elongated member, disposed between and engaged with the brackets of the vehicle frame and coupled with said inner ring so as to confine said inner ring in a fixed location along said elongated member and thereby limit said fastening means and the axle itself to pivotal movement about a fixed point relative to the vehicle frame brackets;

(h) said annular spacers having annular recessed portions defined on adjacent inner ends thereof extending through an opening in said inner ring and confining said inner ring in said fixed location being located between facing shoulders defined by said annular recessed portions of said spacers.

6. The assembly of claim 1 wherein said fastening means includes an annular housing extendable through an opening in the axle.

7. The assembly of claim 6 wherein said annular housing has an annular rim on one axial end thereof for abutting against one side of the axle.

8. The assembly of claim 7 wherein said fastening means also includes an annular retaining element fastenable to an opposite axial end of said housing in order to clamp the axle between said retaining element and said annular rim on said housing.

9. The assembly of claim 8 wherein said annular retaining element is an internally-threaded nut and said opposite axial end of said housing has an externally-threaded section for threadably receiving said nut.

10. An axle pivot assembly for mounting an axle to a pair of brackets of a vehicle frame to undergo pivotal movement about a fixed point relative to the vehicle frame, said axle pivot assembly comprising:

(a) means for rigidly fastening said axle pivot assembly to an axle of a vehicle;
(b) means for coupling said fastening means to an elongated member so as to undergo univeral pivoting about a fixed location relative thereto and to the axle;
(c) said elongated member extendable between and fastenable at opposite ends to said pair of brackets of said vehicle frame and extendable through said coupling means;
(d) means mounted on said elongated member and disposed between and engaged with the brackets of the vehicle frame for confining said coupling means at a fixed location along said elongated member and thereby limiting the axle itself pivotal movement about a fixed point relative to the vehicle frame brackets;
(e) said fastening means including an annular housing extendable through an opening in the axle;
(f) said coupling means including a spherical bearing having an outer annular ring and an inner annular spherical ring universally rotatably mounted within said outer annular ring, said outer ring being stationarily attached to and seated within a bore through said housing; and
(g) a snap ring releasably mountable in a groove defined in a bore of said housing adjacent to one axial end thereof for retaining said outer annular ring seated against a shoulder defined within said bore in said housing.

11. The assembly of claim 10 wherein said elongated member is an elongated bolt extendable between and fastenable at opposite ends to the brackets of the vehicle frame and extendable through an opening in said inner ring of said spherical bearing.

12. The assembly of claim 11 wherein said confining means includes a pair of annular spacers mounted over said elongated bolt, disposed between and engaged with the brackets of the vehicle frame and stationarily coupled with said inner ring so as to confine said inner ring in a fixed location along said elongated member and thereby limit said fastening means and the axle itself to pivotal movement about a fixed point relative to the vehicle frame brackets.

13. The assembly of claim 12 wherein said annular spacers have annular recessed portions defined on adjacent inner ends thereof extending through said opening in said inner ring and confining said inner ring in said fixed location being located between facing shoulders defined by said annular recessed portions of said spacers.

14. An axle pivot assembly for mounting an axle to a pair of brackets of a vehicle frame to undergo pivotal movement about a fixed point relative to the vehicle frame, said axle pivot assembly comprising:

(a) an annular housing extendable through an opening in the axle and having an annular rim on one axial end thereof abutting against one side of the axle;
(b) an annular retaining nut fastenable on an opposite axial end of said housing to clamp the axle between said housing rim and said nut;
(c) a spherical bearing having an outer annular ring and an inner annular spherical ring universally rotatably mounted within said outer annular ring, said outer ring seated and releasably retained against a shoulder defined within a bore in said housing;
(d) an elongated bolt extendable between and fastenable at opposite ends to the brackets of the vehicle frame and extendable through an opening in said inner ring; and
(e) a pair of annular spacers mounted over said bolt, disposed between and engaged with the brackets of the vehicle frame and having annular recessed portions on adjacent inner ends thereof extending through said opening in said inner ring, said spacers confining said inner ring in a fixed location between facing shoulders defined by said annular recessed portions of said spacers and thereby limiting said housing and the axle itself to pivotal movement about a fixed point relative to the vehicle frame brackets.

15. The assembly of claim 14 further comprising:
a snap ring releasably mountable in a groove defined in said bore of said housing adjacent to said one axial end thereof for retaining said outer annular ring seated against a shoulder defined within said bore in said housing.

16. The assembly of claim 14 wherein said elongated bolt has an internal axial passage and an internal radial passage intersecting said axial passage and terminating at a hole defined in an external circumferential surface of said bolt, said internal axial and radial passages together defining a path for flow of a lubricant to said hole from a grease fitting mounted on one end of said bolt, said hole on said bolt being aligned with a gap existing between inner ends of said annular spacers which, in turn, is aligned with an orifice through said inner ring of said spherical bearing such that a lubricant can be supplied along the flow path to an interface between said inner and outer rings of said spherical bearing.

* * * * *